United States Patent [19]

Leach et al.

[11] 3,920,867

[45] Nov. 18, 1975

[54] WATER-INSOLUBLE, ADHERENT ALUMINA COATINGS ON HYDROPHOBIC SURFACES

[75] Inventors: Bruce E. Leach; George G. Hritz, both of Ponca City, Okla.

[73] Assignee: Continental Oil Company, Ponca City, Okla.

[22] Filed: Apr. 30, 1973

[21] Appl. No.: 353,864

[52] U.S. Cl.............. 427/372; 148/6.27; 252/313 R
[51] Int. Cl.².......................................... C23C 3/00
[58] Field of Search............. 117/127, 169, 139 CF; 148/6.27; 252/313 R

[56] References Cited
UNITED STATES PATENTS

| | | | |
|---|---|---|---|
| 2,931,779 | 4/1960 | White............................. | 252/313 R |
| 3,013,901 | 12/1961 | Bugosh.......................... | 117/136 X |
| 3,694,251 | 9/1972 | Houle et al................... | 148/6.27 X |

*Primary Examiner*—John D. Welsh
*Attorney, Agent, or Firm*—F. Lindsey Scott

[57] ABSTRACT

A method for providing insoluble, adherent alumina coatings on hydrophobic surfaces by preparing an alumina dispersion containing a dispersible alumina, a halogenated organic acid, a phosphate compound, and water; contacting said hydrophobic surfaces with the alumina dispersion and thereafter drying.

9 Claims, No Drawings

WATER-INSOLUBLE, ADHERENT ALUMINA COATINGS ON HYDROPHOBIC SURFACES

FIELD OF THE INVENTION

This invention relates to water-insoluble, adherent alumina coatings on hydrophobic surfaces. This invention also relates to water-insoluble adherent alumina coatings on hydrophobic metallic surfaces. This invention further relates to a method for providing water-insoluble, adherent alumina coatings on aluminum, aluminum alloys, chemically treated aluminum, and anodized aluminum.

PRIOR ART

In many applications, it is desirable that metallic and nonmetallic surfaces possess hydrophilic surface characteristics. One instance of such applications is in air-condition cooling units where it is desirable that the metallic surfaces be hydrophilic so that condensed water drains readily from the surfaces rather than forming beads and remaining in place. Desirable metals for such applications are oftentimes subject to corrosion in use. As a result, it is customary to protect such metals from corrosion by a variety of means. When aluminum is used, typically the aluminum is chemically treated or anodized to retard corrosion and the like. Such materials often possess hydrophobic surface characteristics, and it is desirable that the surfaces be made hydrophilic.

A further problem is that high-temperature treatments and the like oftentimes destroy the protective coating placed on the material. It is known that alumina coatings are heat-stable and hydrophilic in nature, and it would be desirable if such coatings could be placed on anodized aluminum, chemically treated aluminum, aluminum metal, and the like for use in applications such as described hereinbefore. Several methods are known for achieving such treatments. One method involves the application of an alumina coating to the surfaces followed by calcining at temperatures in excess of 900°F. Such calcining operations tend to destroy the protective coating placed on the alumina initially; i.e., anodizing or chemically treating.

A second method involves the use of adhesives. Many such adhesives are water soluble or lack the stability necessary as a coating for metallic components which may remain in use for many years.

As a result, a considerable amount of effort has been devoted to a method for producing adherent, water-insoluble alumina coatings on hydrophobic metal surfaces in such a manner that protective coatings applied to the metal surfaces are not destroyed.

OBJECTS OF THE INVENTION

It is an object of the present invention to provide a method for producing adherent, water-insoluble alumina coatings on hydrophobic surfaces. It is a further object of the present invention to provide a method for producing adherent, water-insoluble alumina coatings on hydrophobic metallic surfaces without the necessity for heating above about 250°F. It is a further object of the present invention to provide a method for coating metallic hydrophobic surfaces with alumina in such a manner that protective coatings on the aluminum are preserved.

SUMMARY OF THE INVENTION

It has now been found that the objectives of the present invention are achieved in a method for producing adherent, water-insoluble alumina coatings on hydrophobic surfaces by: admixing a dispersible alumina with an effective amount of a halogenated organic acid containing from 2 to 3 carbon atoms, an effective amount of a water-soluble phosphate compound, and water to produce an alumina dispersion containing at least 5 weight percent alumina as $Al_2O_3$; contacting said hydrophobic metallic surfaces with said alumina dispersion; and, drying to produce said adherent, water-insoluble coatings.

DESCRIPTION OF THE PREFERRED EMBODIMENTS

The method of the present invention is directed to producing adherent, water-insoluble alumina coatings on hydrophobic surfaces by: admixing a dispersible alumina with an effective amount of a halogenated organic acid containing from 2 to 3 carbon atoms, an effective amount of a water-soluble phosphate compound, and water to produce an alumina dispersion containing at least 5 weight percent alumina as $Al_2O_3$; contacting said hydrophobic surfaces with said alumina dispersion; and drying to produce adherent, water-insoluble coatings. The method of the present invention is effective with hydrophobic surfaces such as plastic and metallic surfaces, although metallic surfaces are preferred. The method of the present invention is particularly effective when aluminum, chemically treated aluminum, aluminum alloys, chemically treated aluminum alloys, and anodized aluminum comprise the hydrophobic metallic surface.

Anodized aluminum is used in many outdoor uses, such as in the aircraft industry, the home construction industry, the automotive industry, and the like. Basically, anodized aluminum comprises aluminum having a relatively thick coating of aluminum oxide, $Al_2O_3$, formed on the exterior to protect the metal from further oxidation. The oxide layer also tends to improve the adhesion of paint coatings and the like. Two principal electrolytes are used in anodizing aluminum. Solutions of chromic acid and of sulfuric acid are typically used although, for special purposes, solutions of oxalic acid or phosphoric acid may be employed. The chromic acid baths are typically used when protection against corrosion is most important, while the sulfuric acids baths are more conveniently applied and are more extensively used for general use, such as a base for dye coatings and the like.

In the chromic acid processes, the aqueous solution typically contains from about 3 to about 5 percent chromic acid as chromate. These baths typically employ a relatively high voltage. For instance, the initial potential may be about 40 volts maintained for fifteen minutes followed by about 50 volts for forty-five minutes. The current density is typically from about 2.5 to about 4 amperes per square foot.

In the sulfuric acid processes, the aqueous bath typically contains from about 5 to 15 percent sulfuric acid, and potentials of from about 15 to about 25 volts are used to yield a current density of about 15 amperes per square foot. In both processes, the thickness, hardness, and porosity of the coatings are controlled by the acid concentration, temperatures, and times.

Both types of coatings may be improved by sealing treatments, such as treatment with hot water or live steam. When corrosion resistance is important, the sealing may be done with a hot solution of sodium dichromate or chromic acid.

Numerous methods are known for treating aluminum with chemicals to produce oxide coatings. Such coatings are usually thinner and less corrosion resistant than the anodic oxide coatings, but, since they require no electrical equipment, they are usually somewhat more economical than anodized coatings.

In one such process, two solutions are used. The first solution contains sodium carbonate, which is believed to dissolve the natural oxide film on the aluminum and slightly attack the metal, and the second solution, which contains sodium dichromate is believed to oxidize the metal surface, providing an oxide film, which may be further sealed by treatment with a boiling dilute solution of sodium dichromate.

In another such process, the treating baths contain chromic acid, phosphoric acid, and hydrofluoric acid.

One major advantage of the chemical treatments is that they can be applied to certain aluminum alloys, such as aluminum-silicon alloys, which are not readily coated by anodizing. Numerous other methods are available for chemically treating aluminum.

The method of the present invention is effective when aluminum, aluminum alloys, anodized aluminum, chemically treated aluminum, or chemically treated aluminum alloys comprise the hydrophobic metallic surface.

Halogenated organic acids containing from 2 3 3 carbon atoms are suitable for use in the process of the present invention. Preferred acids are chloroacetic acid, dichloroacetic acid, and chloropropionic acid. Very desirable results have been achieved wherein chloroacetic acid was used.

Water-soluble phosphate compounds are used in forming the alumina dispersion of the present invention. Suitable water-soluble phosphate compounds are selected from the salts of phosphoric and pyrophosphoric acid with ammonia and metals, wherein said salts have a solubility in water at 20°C of at least 1 gram per hundred milliliters of water. Preferred phosphate compounds are selected from the group consisting of the sodium, potassium, and ammonium salts of phosphoric acid and the sodium, potassium, and ammonium salts of pyrophosphoric acid.

In the practice of the method of the present invention, an aluminum dispersion is produced and contacted with the hydrophobic metal surfaces to coat such surfaces with alumina, which is thereafter dried. The alumina dispersion is produced by mixing a dispersible alumina with a halogenated organic acid, a phosphate compound, and water. The components may be mixed in any desired proportion so long as sufficient acid and phosphate are present to cause the alumina to strongly adhere to the hydrophobic metal surfaces after drying. Suitable alumina dispersions contain at least 5 weight percent alumina as $Al_2O_3$ and from about 7 to about 100 parts acid per 100 parts of alumina as $Al_2O_3$ and from about 7 to about 100 parts phosphate as $PO_4$ per 100 parts $Al_2O_3$. Preferred alumina dispersions contain from about 20 to about 75 parts acid per 100 parts $Al_2O_3$ and from about 10 to about 60 parts phosphate as $PO_4$ per 100 parts $Al_2O_3$. The ratios recited herein are by weight unless otherwise stated.

Particularly desirable results have been achieved wherein the dispersible alumina has the following properties:

1. crystal structure — alpha alumina monohydrate
2. crystal structure after calcining to 900°F — gamma alumina
3. ultimate crystal size (x-ray diffraction)
   020 reflection 30–70A
   021 reflection 60–110A
4. pore volume 0.35–0.65 cc/g
5. loose bulk density 35–70 lb/ft$^3$
6. particle size (sieve)
   <45 microns — 20%
   >45 microns — 80%
7. $Al_2O_3$ content 65–85 wt %
8. loss on ignition 15–35 wt %
9. surface area 150–350 in$^2$/g Such alumina is marketed by Continental Oil Company of 1300 Main Street, Houston, Texas, under the trademark DISPAL.

The alumina, acid, phosphate, and water may be mixed in any desired sequence so long as a mixture of substantially uniform consistency is achieved prior to contacting the hydrophobic metal surfaces. As noted hereinbefore, particularly desirable results have been achieved wherein the hydrophobic metallic surfaces comprise aluminum, aluminum alloys, chemically treated aluminum, anodized aluminum, and chemically treated aluminum alloys.

It has been observed in tests of numerous materials, such as mineral acids, halogenated alcohols, metallic halogen salts, organic acids, organic amines, and organic amides, that none of the materials tested produced adherent coatings comparable to the coatings produced by the method of the present invention.

Particularly desirable results have been obtained by the method of the present invention wherein the metallic surfaces were anodized aluminum and wherein chloroacetic acid and phosphoric acid were used. The aluminum dispersion in a particularly preferred embodiment comprises from about 5 to about 15 weight percent alumina, from about 1 to about 5 weight percent chloroacetic acid, and from about 1 to about 5 weight percent phosphoric acid with the balance being water.

The contacting of the hydrophobic metallic surfaces with the alumina dispersion may be by any convenient method so long as intimate contact is achieved.

Many variations and modifications are possible within the scope of the present invention, and such variations and modifications may appear obvious or desirable to those skilled in the art upon a review of the foregoing descriptions of preferred embodiments and the appended examples.

EXAMPLES

Dispersions of alumina were prepared by dissolving DISPAL alumina in water containing acidic materials. Phosphoric acid was then added as 85 percent phosphoric acid in water and mixed to form a dispersion of uniform consistency. Chromic acid anodized aluminum metal parts were dipped in this dispersion and thereafter dried at 250°F overnight. The coating properties obtained with the various materials are shown in Table 1.

TABLE 1

| Test No. | Alumina (g) | Acid Type | g | Phosphate Type | g | Water (g) | Coating Properties |
|---|---|---|---|---|---|---|---|
| 1 | 40 | chloroacetic | 25 | phosphoric acid | 21.7 | 475 | adhered strongly - could not be washed or rubbed off |
| 2 | 40 | chloroethanol acetic acid | 25<br>25 | phosphoric acid | 9.2 | 750 | good coating - but inferior to Test No. 1 in adhesion |
| 3 | 40 | polyvinyl alcohol<br>acetic acid | 25<br>25 | phosphoric acid | 9.2 | 600 | no adhesion |
| 4 | 40 | $TiCl_2(OC_4H_9)_2$<br>HCl | 32<br>10 | phosphoric acid | 9.2 | 500 | some attack on Al surface |
| 5 | 40 | ascorbic acid<br>acetic | 5<br>10 | phosphoric acid | 9.2 | 500 | poor adhesion |
| 6 | 40 | hexamethyl-benetetramine<br>HCl | 10<br>10 | phosphoric acid | 9.2 | 500 | attacked chrome coating |
| 7 | 20 | polyacrylamide<br>$HNO_3$ | <br>5 | phosphoric acid | 1.7 | 250 | thick slurry dried well to give thick coats - fair adhesion |

The alumina coatings produced by the method of the present invention have been found to be adherent when dried at 250°F, although higher temperatures, up to about 900°F, may be used. It is pointed out that the coatings of the present invention are adherent desirable coatings when dried at temperatures lower than 250°F although the drying process is, of course, slower.

It is believed that the foregoing examples in Table 1 illustrate effectively that unusual and unexpectedly superior alumina coatings on hydrophobic metallic surfaces are obtained by the process of the present invention.

Having thus described the invention, I claim:

1. A method for producing adherent, water-insoluble alumina coatings on hydrophobic metallic surfaces selected from the group consisting of aluminum, aluminum alloys, anodized aluminum, chemically treated aluminum and chemically treated aluminum alloys by:
   a. coating said hydrophobic metallic surfaces with an alumina disperson to produce alumina coated metallic surfaces said alumina dispersion containing at least 5 weight percent alumina as $Al_2O_3$, from about 7 to about 100 parts by weight of a halogenated organic acid containing from 2 to 3 carbon atoms per 100 parts $Al_2O_3$, from about 7 to about 100 parts by weight phosphate as $PO_4$ per 100 parts $Al_2O_3$ and water; and
   b. drying said alumina coated metallic surfaces to produce said adherent water-insoluble alumina coatings on said hydrophobic metallic surfaces.

2. The method of claim 1 wherein said dispersion contains from about 5 to about 15 weight percent alumina.

3. The method of claim 2 wherein said halogenated organic acid is selected from the group consisting of chloroacetic acid, dichloroacetic acid, and chloropropionic acid.

4. The method of claim 3 wherein said phosphate is added as a compound selected from the group consisting of phosphoric acid, salts of phosphoric and pyrophosphoric acid with metals and ammonia and mixtures thereof wherein said salts have a solubility in water at 20°C of at least 1 gram per hundred milliliters of water.

5. The method of claim 4 wherein said salts are selected from the group consisting of the sodium, potassium, and ammonium salts of phosphoric acid and the sodium, potassium, and ammonium salts of pyrophosphoric acid.

6. The method of claim 5 wherein said alumina dispersion contains from about 20 to about 75 parts acid per hundred parts $Al_2O_3$ and from about 10 to about 60 parts phosphate as $PO_4$ per hundred parts $Al_2O_3$.

7. The method of claim 6 wherein said alumina dispersion contains from about 5 to about 15 weight percent alumina, from about 1 to about 5 weight percent chloroacetic acid, and from about 1 to 5 weight percent phosphoric acid with the balance being water.

8. The method of claim 7 wherein said coatings are dried at a temperature lower than 250°F.

9. The method of claim 1 wherein said halogenated organic acid is chloroacetic acid and wherein said phosphate is added as phosphoric acid.

* * * * *